United States Patent Office.

EDGAR D. BURRILL, OF PROVIDENCE, RHODE ISLAND.

Letters Patent No. 101,094, dated March 22, 1870.

IMPROVED MEDICAL COMPOUND.

The Schedule referred to in these Letters Patent and making part of the same.

*To all whom it may concern:*

Be it known that I, EDGAR D. BURRILL, of Providence, in the county of Providence and State of Rhode Island, have invented a new and valuable Improvement in Medical Compounds; and I do hereby declare that the following is a full, clear, and exact description of the same.

My invention relates to medical compounds; and

It consists in a novel combination of medicinal substances intended to serve as a valuable remedy for dysentery and other kindred diseases.

My compound is formed as follows, namely:

I take one table spoonful of allspice, one table spoonful of cinnamon, and one table spoonful of rhubarb, each ground fine, and boil them together in as small a quantity of water as will serve to extract the strength of the ingredients, until their strength is well extracted.

I next strain the solution formed as above, and add to it one-fourth quart of brandy. The proportions herein given will serve as a guide in manufacturing my remedy in large quantities, but may be varied somewhat to conform to the quality of the ingredients used.

What I claim as my invention is—

The combination of allspice, cinnamon, rhubarb, and brandy, as and for the purpose specified.

In testimony that I claim the above, I have hereunto subscribed my name in the presence of two witnesses.

EDGAR D. BURRILL.

Witnesses:
   JOHN C. TUFTS,
   JOHN CARROLL.